Figure 1:
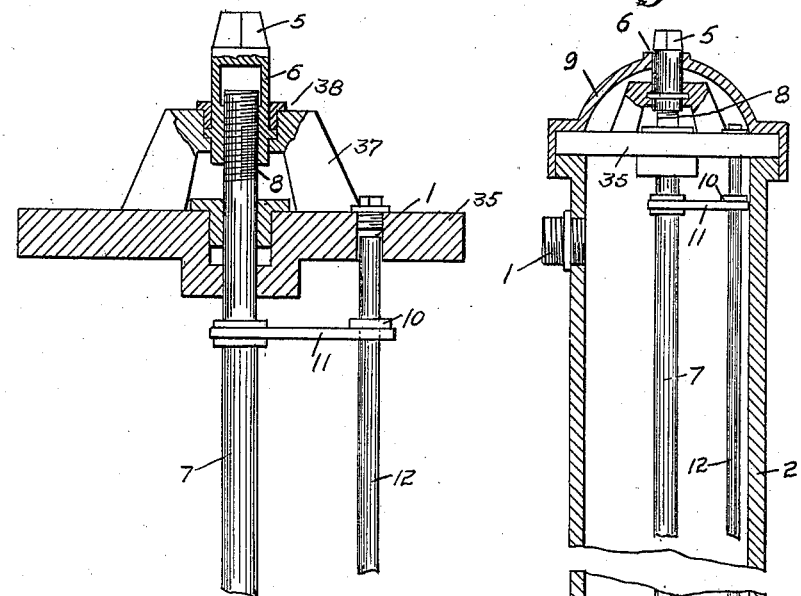

J. KNICKERBACKER.
FIRE HYDRANT.
APPLICATION FILED JUNE 14, 1909.

990,989.

Patented May 2, 1911.

WITNESSES:
Walter C. Paul.

INVENTOR
John Knickerbacker,
BY W. Schoenborn
ATTORNEY

UNITED STATES PATENT OFFICE.

JOHN KNICKERBACKER, OF TROY, NEW YORK, ASSIGNOR TO EDDY VALVE COMPANY, OF WATERFORD, NEW YORK, A CORPORATION OF NEW YORK.

FIRE-HYDRANT.

990,989.        Specification of Letters Patent.        Patented May 2, 1911.

Application filed June 14, 1909. Serial No. 501,999.

*To all whom it may concern:*

Be it known that I, JOHN KNICKERBACKER, a citizen of the United States, residing at Troy, in the county of Rensselaer and State of New York, have invented certain new and useful Improvements in Fire-Hydrants, of which the following is a specification.

The present invention relates to improvements in hydrants and particularly to that type of fire hydrants, also known as "fire plugs," which are termed compression-hydrants because the main valve is normally held to its seat by the pressure of the water behind it.

The prime objects of the invention are to provide an efficient, reliable and easily operable device of the type in question wherein the valves are more readily actuated and controlled than heretofore, and the seating action thereof rendered more effective.

In the preferred embodiment of the invention and as illustrated in the drawings, the structure includes a main and auxiliary valve and a drip valve, all operated from a common actuating stem and nut.

The matters of invention in detail will be better understood from the following detailed description taken in connection with the accompanying drawings and the features of novelty will hereafter be particularly pointed out in the appended claims.

Figure 2:
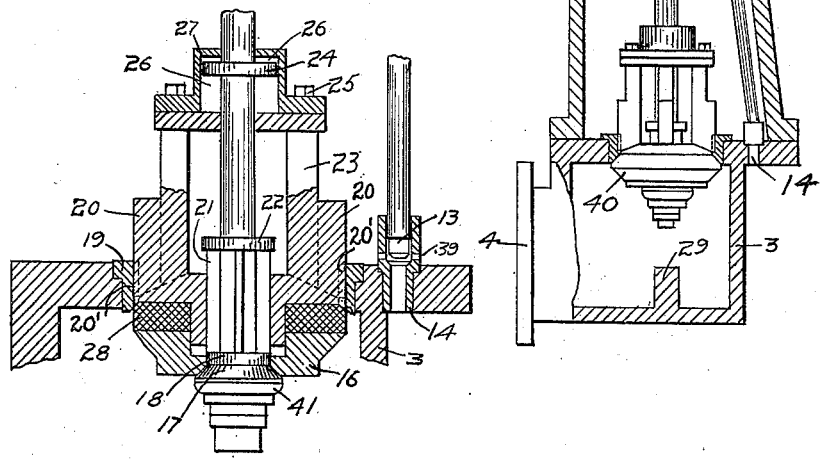

Referring to the drawings: Figure 1, is a central, vertical section showing the improved structure, the same being broken away centrally and details of the valve parts being shown in elevation. Fig. 2, is a like centrally broken away, vertical section of the valves and controlling parts, the same being on an enlarged scale.

The stand pipe 2 with its hose connection 1 is of a usual form and has secured thereto the bottom 3 connected with the pressure main, and the cover 9, these parts being suitably bolted to flanges at either end of the stand pipe as shown. The bottom 3 is shown as provided with a usual flange 4 for attachment to the pressure main.

The hydrant stem 7 has its upper end threaded as at 8 to engage threads on an operating nut 6, said nut having a squared end 5 for convenient manipulation.

The nut 6 is provided with an external flange as shown, and is held in place in the yoke 37 by a threaded follower nut 38. The yoke 37 is preferably formed integral with the yoke plate 35 which plate is clamped between the cover 9 and the stand pipe 2 as shown.

To the hydrant stem 7 is secured a lateral arm 11, said arm having at its outer extremity a hole to receive the drip rod 12. The drip rod 12 has thereon a collar 10 arranged to support the same on lateral arm 11 when said arm is elevated, and at the bottom thereof is the drip plug 13 adapted to close the passage through drip cup 14 when seated. When the stem 7 rises in the operating nut 6 to a certain extent the arm 11 comes in contact with the collar 10 and raises plug 13 thus allowing the water in stand pipe 2 to drain out through the apertures 39 in the drip cup 14.

The hydrant stem 7 is directly attached to an auxiliary valve 41, said valve being arranged to close a central aperture in the main valve 40. This auxiliary valve has a beveled seating portion 17 adapted to fit a seat 16 in the lower part of the main valve and thereabove a cylindrical portion 18 adapted to have a sliding fit in the central opening of the main valve. Above said portion 18 connection is effected with the stem 7 by ribs 21 and collar 22 as shown.

The main valve 40 consists of a disk having a beveled edge and suitable packing 28 adapted to seat upon a correspondingly beveled seat 19 within the hydrant bottom 3 making a water tight joint. Said main valve 40, having a spline and feather connection with its seat 19, by means of a narrow section 20 on each side passing through corresponding slots 20' in the seat.

The main valve 40 is further provided with upwardly projecting arms 23 arranged to carry a dash pot 27 secured thereto by bolts 25. The stem 7 carries a collar 24 adapted to serve as a piston in the cylindrical opening 26 of the dash pot 27, this construction being provided to overcome the tendency of the main valve to close too forcibly.

An abutment 29 is disposed in the bottom 3 to limit the opening of the main valve.

In operation the main valve is first brought to its seat by the pressure of water underneath it upon manipulation of the stem 7 to allow this, and the auxiliary valve has a comparatively small amount of opening to shut off. By the use of the cylinder 18 the water is substantially closed off before the last upward motion of the stem which operates the drip plug 13. It is apparent that the leakage around the small cylinder 18 is much less than it would be around a corresponding cylinder on the main valve 40, and that therefore little water is lost when the drip 14 is open. It will be further seen that upon actuating the stem to open the valves, the auxiliary valve will be opened first. Thus pressure is admitted to the stand pipe whereby the main valve becomes balanced and falls by its own weight or may be easily opened.

Having now fully described my invention in a preferred embodiment thereof, what I claim as new and desire to secure by Letters Patents is as follows:—

1. A hydrant comprising a stand pipe, a main valve to control admission thereto, a dash pot carried by said main valve, an auxiliary valve connected with said dash pot and having a seating surface to further control admission to said stand pipe and a portion on said auxiliary valve arranged to substantially check admission before said seating surface becomes effective.

2. A hydrant comprising a stand pipe, a main valve to control admission thereto, a dash pot carried by said main valve, an auxiliary valve connected with said dash pot and having a seating surface and a portion to substantially check admission before said seating surface becomes effective, and a common actuator for said valves.

3. A hydrant comprising a stand pipe, a main valve to control admission thereto, a dash pot carried by said main valve, an auxiliary valve connected with said dash pot and having a seating surface and a portion to substantially check admission before said seating surface becomes effective, a drain device, and a common actuator arranged to successively actuate said main and auxiliary valves, and said drip device.

4. A valve mechanism comprising a main valve, a dash pot carried by said main valve, an auxiliary valve connected with said dash pot, a drain valve, and a common actuator for said valves having connections to first effect closure of the main valve and thereafter with a continuing movement to successively effect substantial closure of the auxiliary valve, opening of the drain valve and complete closure of the auxiliary valve.

5. A valve mechanism comprising a main valve, a dash pot carried by said main valve, an auxiliary valve connected with said dash pot, an operating stem secured to said auxiliary valve.

6. A valve mechanism comprising a main valve, having a central opening therethrough, a dash pot carried by said main valve, an auxiliary valve to control said opening and connected with said dash pot, an operating stem secured to said auxiliary valve and extending centrally through said main valve.

In testimony whereof I affix my signature in presence of two witnesses.

JOHN KNICKERBACKER.

Witnesses:
 FRED. S. ROBINSON,
 WALTER S. ROBINSON.

---

Copies of this patent may be obtained for five cents each, by addressing the "Commissioner of Patents, Washington, D. C."